Nov. 11, 1969          W. KITAJ          3,477,890
FOAMED RESIN ARTICLES AND METHOD FOR PRODUCTION
Original Filed April 8, 1964                    2 Sheets-Sheet 1

INVENTOR.
WALTER KITAJ
BY
Claron K. White
Leslie H. Blair
ATTORNEYS

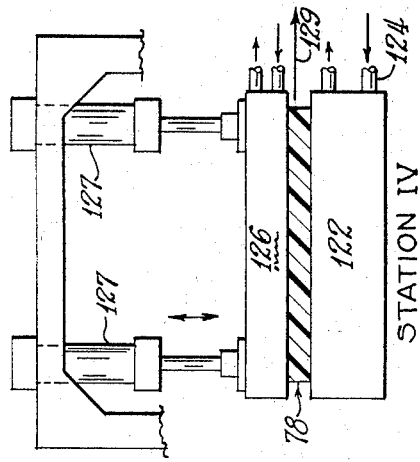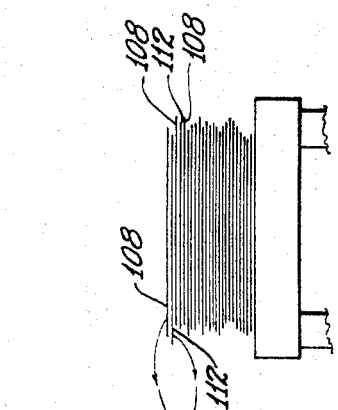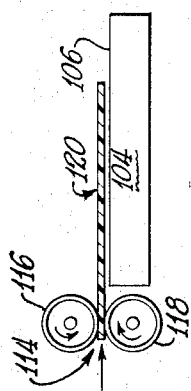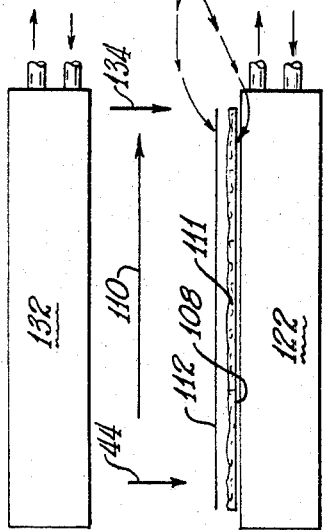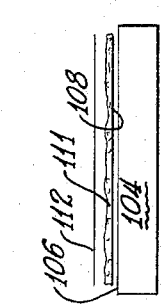

United States Patent Office 3,477,890
Patented Nov. 11, 1969

3,477,890
FOAMED RESIN ARTICLES AND METHOD FOR PRODUCTION
Walter Kitaj, Toledo, Ohio, assignor to Owens-Illinois, Inc., a corporation of Ohio
Continuation of application Ser. No. 358,223, Apr. 8, 1964. This application Jan. 19, 1968, Ser. No. 699,979
Int. Cl. B32b 5/20, 31/06
U.S. Cl. 156—79                     4 Claims

ABSTRACT OF THE DISCLOSURE

Rind-free foamed polyurethane structures of uniform density are formed by applying a foamable polyurethane material as a liquid layer onto a first porous fibrous sheet while the sheet and the liquid layer are maintained at about 70° F. The foamable polyurethane material is so formulated as to be capable of remaining in a liquid form prior to foaming for at least about 60 seconds from the time that the material is prepared. Thereafter, the liquid layer is covered with a second porous fibrous sheet such that the liquid layer is sandwiched between the two fibrous sheets whereupon sufficient pressure is then applied between the first and second fibrous sheets to uniformly spread out the liquid layer between the sheets and to impart a uniform thickness thereto. The liquid layer sandwiched between the two sheets is then maintained in liquid form without the addition of heat thereto for a sufficient period of time to stabilize the layer whereinafter autogenous foaming of the material is allowed to progress until substantially ultimate foamed thickness is achieved. The time during which the stabilization and autogenous foaming occurs is from 30 to 60 seconds. After this autogenous foaming, the outer surface of only one of the fibrous sheets is heated to a temperature of 150 to 300° F. to cure the foamed polyurethane by the heat passing through from the outer surface of the fibrous sheet. It has been found that heating only one of the fibrous sheets effects substantially higher edgewise compression strength than otherwise would be achieved if both of the fibrous sheets were heated. Sufficient pressure is applied to the outer surface of the non-heated fibrous sheet while the foam is being subjected to heat and is being cured, to smooth the fibrous sheet. However such pressure is insufficient to compress the polyurethane layer.

This application is a continuation of Ser. No. 358,223, filed Apr. 8, 1964, now abandoned.

This invention relates to the production of sheets or boards of foamed synthetic resins having improved uniformity of density. More particularly, this invention relates to a method for producing board-like articles and laminates of foamed synthetic resins; still further, the invention relates to the novel boards and laminates so produced, and having higher strengths through improved uniformity of density, in weights of two pounds per cubic foot and less. Also, the invention relates to the resin compositions of delayed action foaming characteristics, for producing such articles and for use in such method.

THE PROBLEM

Foamed polyurethane resins, particularly the so-called rigid foams, are very desirable for cushioning applications. These are especially useful for making boxes for shipping bottled products and the like. However, in order to be satisfactory for such applications, they must have high flexural compression strengths in the lower densities, such as two pounds per cubic foot and less. Prior products have not exhibited satisfactory strengths in these low density ranges.

Further, in thin layers, these cellular materials have been very difficult to prepare. As made by most prior methods, the upper and lower surfaces of cast polyurethane foams have been characterized by thick, irregular rinds that must be discarded, because these are useless. This means that layers foamed from a thin deposit of reactive materials have been little more than solid polyurethane with bubbles irregularly distributed therethrough. Accordingly, in the past, thin cellular sheets of foamed resins have been made by slicing thick slabs of the foamed material to the desired dimensions, after removing and discarding the rinds on the surfaces.

Accordingly, in addition to being unsatisfactory from a strength point of view, the prior products have only been produced by the more expensive slicing method.

Therefore, an important advancement to the art of polyurethane foams would be provided by thin, sheet-like articles of foamed resin systems of high strengths in the lighter weights of two pounds per cubic foot and less, and having uniform density throughout their thickness. Further, an advancement to the art would be provided by a novel method for producing such novel articles; and still further, an advancement to the art would be provided by novel foaming compositions for producing the articles and practicing the novel method mentioned.

It is accordingly an important object of the present invention to provide novel synthetic resin laminates comprising a foamed resin body material having autogenously bonded, porous cover films on the major surfaces thereof.

A further object is to provide a novel foaming composition for producing the articles above.

A still further object is to provide a method for producing foamed resin laminates having porous surface films autogenously bonded thereto.

A still further object is to provide a method for producing board-like, foamed resin articles having weights of two pounds per cubic foot and less, characterized by improved uniformity of density, and by the absence of rind layers at the surfaces thereof.

A further object is to provide a method for producing foamed laminates, utilizing a nip between cover films, in one step of developing the liquid layer thickness from the resin system, prior to foaming.

A further object is to provide a method for producing thin, board-like articles from foamed resins wherein the resin is laid out in liquid form in a layer, and a definite and controlled delay is established to permit the liquid layer to stabilize, before any foaming of the resin is effected.

A further object is to provide a method for producing thin, board-like articles from foamed resins wherein the resin layer is autogenously foamed partially, before heat of cure is applied, giving improved uniformity of density and high strength cover film bond.

Other objects of the invention will appear in the following description and appended claims, reference being had to the accompanying drawings forming a part of this specification wherein like reference characters designate corresponding parts in the several views.

FIGURE 2 is a schematic, side elevational view of apparatus illustrating an incremental process in accordance with the invention; and FIGURE 3 is a schematic, side elevational view of apparatus illustrating the fixed or single station process of the present invention.

It is to be understood that the invention is not limited in its application to the details of construction and arrangement of parts illustrated in the accompanying drawings, since the invention is capable of other embodiments and of being practiced and carried out in various ways. Also, it is to be understood that the phraseology or terminology employed herein is for the purpose of description and not of limitation.

A PERSPECTIVE VIEW OF THE INVENTION

Briefly, the present invention has three aspects as follows:

(1) A novel method for producing a laminate, comprising an inner layer of foamed, synthetic resin and covering films of porous materials, such as kraft paper, autogenously bonded to the inner layer in a reinforcing manner; and without surface rinds, next to the cover films.

A unique aspect of the method resides in the fact that a liquid layer is formed and then stabilized before any foaming is permitted to begin. Further the foaming is substantially autogenously completed before external heat is applied for curing.

(2) The novel laminates produced by the method above; and (3) Unique foaming compositions, with a particular delayed action between mix time and initiation of foaming, that permit a liquid layer to be formed, and then stabilized in liquid form before foaming, to produce the novel laminates of aspect 2 above, having unique uniformity of density in lower weight materials.

THE METHOD

There are three aspects to the method of the present invention as shown on the accompanying drawings, and listed as follows:

(1) A continuous aspect wherein a liquid layer of foamable resinous material is first laid down and held in such liquid condition for a definite delay period before foaming is begun. This permits the liquid layer to stabilize prior to the beginning of any foaming. In this aspect of the method, the laminate is formed and the resin cured while all components are moved in a continuous and rapid, linear manner;

(2) In an extended aspect of the invention, actually comprising a retrogression from a fully continuous system, there is an incremental or step processing aspect. In this aspect of the invention, individual sheets of material are formed, which progress from one fixed processing station to the next; and (3) In a further retrogression from a totally continuous system, a fixed station is encompassed within the scope of the invention. In this aspect of the invention, the operations of laying up the laminate, delaying action of foaming to stabilize the liquid layer for improved uniformity of density in the foamed layer, foaming the resin without heat, and then applying heat to more fully cure, followed by autogenous cure to ultimate strength characteristics, are all carried out at a single, fixed station, with all components being brought to the single station for processing.

In view of the foregoing, brief resume, these various aspects of the invention will be developed in detail.

THE CONTINOUS EMBODIMENT

Figure 1:
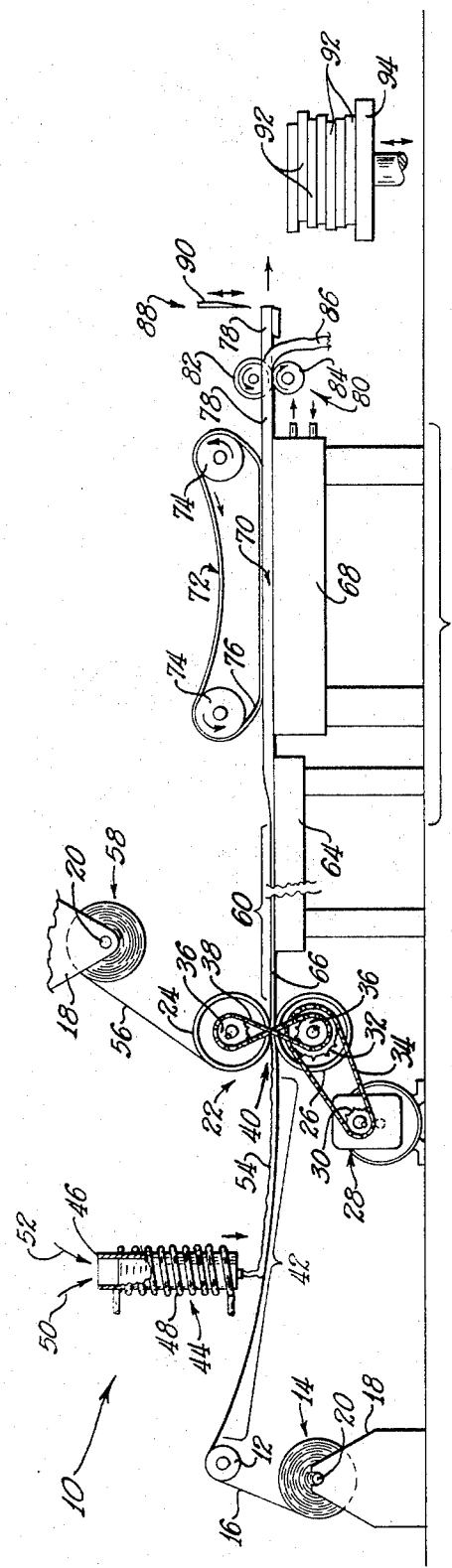
FIGURE 1 is a side elevation view of apparatus for effecting the continuous process of the present invention.

Please refer to FIGURE 1 of the drawings for this discussion.

As there shown, a continuous production line 10 is utilized. At the left hand side or entrance end, there is provided a freely rotatable guide roll 12. Positioned a proximate distance from the guide roll 12 is a bulk roll 14 of web material 16. As will become apparent hereafter, web material 16 comprises the bottom cover film of the laminate produced by this process.

In the preferred aspect of this invention, the web 16 is kraft paper having a weight of 42 pounds per papermaker's ream, comprising a stack of 500 sheets measuring 24 x 36 inches.

It is to be understood that this is merely illustrative of paper weights that can be used, and that paper weights will be varied depending upon the particular laminate to be tailor made in accordance with the invention.

Support members 18 carry a shaft 20 on which bulk roll 14 is placed for free rotation. This permits the bottom cover film 16 to be paid off in a linear manner for continuous processing throughout the remainder of the operation.

Further to the right, there is provided a pair of nip rolls 22. The upper roll of this pair 22 is designated 24 and the lower roll is 26. These rolls are mounted for powered rotation on frame elements, not shown. A gear motor unit 28 is suitably mounted on the floor and is provided on its output shaft with a sprocket 30. Lower roll 26 also has its shaft fitted with a power-receiving sprocket 32. A chain 34 laps sprockets 30 and 32 in driving relation.

From the foregoing it will be evident that the lower roll 26 is power driven.

Also, the shafts of both the upper and lower rolls 24 and 26 are fitted with equal sized sprockets 36. A chain 38 laps these sprockets 36 in driving relationship. Thus, both rolls 24 and 26 are driven from a common power source, at identical peripheral speeds.

It will be noted that web 16, from bulk roll 14, feeds over the idler and guide roll 12 to the horizontal nip 40.

A substantial length of web 16 spans the distance 42 between the idler roll 12 and the nip 40. Note that the web spanning the distance 42 is unsupported and therefore is free to travel at substantial speeds without frictional engagement with any supporting surface such as tables and the like as used in the prior art. Also, the web is freely exposed to the ambient atmosphere.

The distance 42 provides room for a resin applicator gun 44 to apply a resin bead to the bottom cover film. This is essentially a cylindrical container 46, having a refrigeration coil 48 wrapped around it. By means of this construction, the resin mix, introduced by lines 50 and 52, can be kept at a sufficiently low temperature of about 70° F. to keep the foaming reaction from starting, until an appropriate time, as will be discussed in full hereinafter.

In accordance with the present method, a controlled amount of liquid resin mixture, of delayed action character, is laid down on the bottom cover film 16 as a bead 54. When bead 54 enters the nip 40, it is spread in accordance with the spacing or setting of the nip to a board width commensurate with the amount of resin applied. It will be understood that substantially any width and thickness of board can be formed by this operation. With greater thicknesses, more resin is applied, and the nip setting is larger. With lesser thicknesses of board, less resin is applied, and the nip setting is finer.

It is at this point that the caliper or thickness of the final laminate is established. Here is the place where the caliper is preestablished.

In the prior art, spreading of the resin into a layer of appropriate thickness has been effected by means of a doctor blade. Refer to U.S. Patent 2,956,310 dated Oct. 18, 1960, FIGURE 1 for a disclosure of this type of operation. Experiments by the present inventors, which lead to the present invention, were made along the lines of the cited patent. The experiments indicated this to be an unsatisfactory method of procedure. The doctor blade quickly accumulated a coating of resin and became inaccurate. Thus, the caliper of the boards could not be accurately controlled in a production operation. The knife could not be rendered self-cleaning.

It is therefore a novel aspect of the present invention that the nip formed by and between the cover films themselves is utilized to establish the liquid layer thickness.

Or, stated in other words, the nip is utilized to pre-determine the ultimate thickness of the laminate.

The top cover film utilized in the present process is designated 56. This is supplied from a bulk roll 58. Bulk roll 58 is suitably mounted for rotation and pay-out of the top cover film 56 in the manner described for the bulk roll 14.

It is to be understood that the bulk rolls 14 and 58 are suitably braked or frictionally retarded in order to keep the webs 16 and 56 sufficiently taut to be frictionally engaged by the nip rolls 24 and 26. Thus, a slight tension will cause proper frictional engagement between the webs and the nip rolls so that the laminate is accurately propelled through the process.

The top cover film 56 laps the upper nip roll 24 and proceeds through the nip 40, as indicated, in a counter-clockwise manner. It will be evident at this point of the description that the nip 40 between the porous cover webs themselves distributes the resin as mentioned above.

THE LIQUID LAYER STABILIZATION ZONE

Another important feature of the present invention comprises a liquid layer stabilization zone indicated by numeral 60, before the liquid lay up enters a foaming zone 62.

It will be noted in FIGURE 1 that an unheated support or runout table 64 is provided beneath the liquid layup 66. This table is of suitable length, commensurate with line speed, to give the delay desired in layup stabilization zone 60 before any discernable foaming reaction takes place.

In an actual embodiment of the present invention, the novel foam composition of Example I was utilized. It is to be understood that this resin is capable of a 60 second delay before any foaming starts. It should be noted however that this does not mean that the stabilization zone 60 is sixty seconds in length. The mechanics involved are as follows:

The resin is mixed in the applicator gun 44. There is a short residence time at this point. Then the resin mix proceeds through the gun nozzle as a ribbon or bead 54, toward the nip 40. The distance 42, which the bead 54 must traverse, produces a first delay, permitting the liquid material to become stabilized as such. Thereafter, the liquid layer is formed at the nip 40 and then must traverse the stabilization zone 60. This will make it evident to one skilled in the art why a resin system capable of a 60 second delay is necessary to provide the subtle liquid layer stabilization time mentioned above.

EXAMPLE I

One specific delayed action resin formulation, useful in accordance with the present invention, is as follows:

TOTAL FORMULA

| Component | Parts |
|---|---|
| Polyoxypropylene adduct of an aromatic triol; mol. wt. 440; OH number 380, trademark Triol LK-380, by Union Carbide [1] | 33.0 |
| Diethylenetriamine pentapropanol 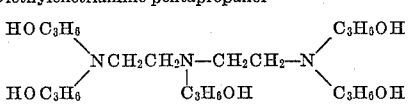 mol. wt. 400; OH number 700, trademark Pentol LA-700, by Union Carbide | 2.0 |
| Sorbitol propylene oxide; mol. wt. 530; OH number 640, trademark Hexol G-2406, by Atlas | 3.8 |
| Silicon glycol copolymer used as emulsifier, trademark Silicone DC-113, by Dow Corning | 0.8 |
| Catalyst: 1 part triethylenediamine to 2 parts 1,2,6-hexanetriol | 1.4 |
| Trichloromonofluoromethane, CCl₃F | 15.5 |
| Crude diphenylmethane-4,4'-diisocyanate 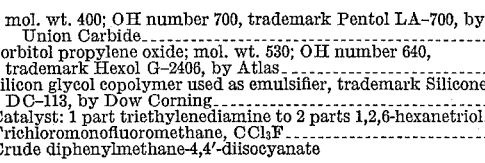 | 43.5 |
| Total | 100.0 |

[1] This adduct of an aromatic triol is formulated in accordance with the disclosure of U.S. Patent No. 3,412,047.

Relative to the above formulation, the diamine catalyst can be reduced to 1.2% and 0.002% dibutyl tin diacetate used to provide another catalyst system.

Of the above, feed line 50 of FIGURE 1 metered in the following material: crude diphenylmethane-4,4'-diisocyanate.

The second feed line, namely line 52 in FIGURE 1 metered in the following mixture:

| | Parts by wt. |
|---|---|
| Polyoxypropylene adduct of an aromatic triol, see Example I | 58.5 |
| Diethylenetriamine pentapropanol | 3.4 |
| Sorbitol propylene oxide | 6.8 |
| Silicon glycol copolymer | 1.4 |
| Triethylene diamine-1,2,6-hexanetriol catalyst | 2.4 |
| CCl₃F | 27.5 |
| Total | 100.0 |

In the mixhead 44, 130 parts of resin were admixed with 100 parts of the diethylenetriamine pentapropanol.

EXAMPLES II AND III

Two other specific resin formulations, useful in accordance with the present invention, for making rigid foams, are as follows:

| Component | K236 fast, Parts | K236 slow, Parts |
|---|---|---|
| Polyoxypropylene adduct of an aromatic triol; mol. wt. 440; OH number 380 | 33.6 | 33.6 |
| Diethylenetrigine pentapropanol | 2.0 | 2.0 |
| Sorbitol propylene oxide | 4.0 | 4.0 |
| Silicon glycol copolymer emulsifier | 0.8 | 0.8 |
| Triethylene diamine-1,2,6-hexanetriol catalyst | 0.6 | 0.03 |
| Dibutyl tin diacetate catalyst | 0.04 | 0.03 |
| CCl₃F | 16.0 | 16.0 |
| Crude diphenylmethane-4,4'-diisocyanate | 43.3 | 43.3 |

Regarding the above formulations, it will be noted that the fast system contains 0.6% triethanolamine vs. 0.03% for the slow system; and that the fast system contains 0.04% dibutyl tin diacetate vs. 0.03% for the slow system.

EXAMPLE IV

A flexible foam formulation for use in the present invention is as follows:

| Component: | Parts |
|---|---|
| Blend of triols and diols; OH number 56, trademark W-6 Polyol by Wyandotte | 69.2 |
| Silicon glycol copolymer emulsifier, trademark Silicone DC-199 by Dow Corning | 0.8 |
| Catalyst: 1 part triethylenediamine to 2 parts 1,2,6-hexanetriol | 0.3 |
| Dibutyl tin diacetate | 0.1 |
| Water | 2.1 |
| Toluene diisocyanate | 27.5 |
| Total | 100.0 |

This formnulation has a cream time of 10 seconds and a foam time of 55 seconds. When the catalyst is reduced to 0.15% and the time compound to 0.05%, the cream time is increased to 15 seconds and the foam time to 110 seconds.

THE CURE ZONE

It is an important aspect of the present invention that the cover films are merely ironed or flattened onto the foam interlayer in the cure zone or foaming zone 62. Thus, there is no compression applied to control the thickness of the boards that would tend to densify them.

According to the present invention, therefore, a heated table 68 is used beneath the layup 66 as part of the cure and foaming zone 62. This serves to iron the bottom cover film and at the same time, transfer activating heat into the foaming layup 70.

Above the foaming dayup 70, there is a free-running, endless belt 72. Spaced rolls 74 are rotatably journaled in space above the table 68, and the endless belt 72 laps these rolls 74 and is thus supported. Slack condition is retained in the endless belt 72; and thus the lower flight 76 merely floates on the foaming layup 70.

Care is exercised that no compression, densification, or distortion of the foaming layer 70 is produced. Only enough frictional engagement between the endless belt 72 and the top cover film 56 is applied to smooth or iron out the cover film against waves or variations of thickness.

At this point, it is appropriate to carefully describe another subtle feature of the present invention. Thus, it will be noted that part of the foaming zone 62 extends to the left of the heated table 68. Thus, a sufficient distance is provided to permit the resin to autogenously foam before curing heat is applied. It will be noted that the residence time in the liquid state ends at the end of the liquid layer stabilization zone 60. Then, foaming is initiated and due to the short foam time of the resin system, a substantial part of the foaming takes place before the heated table 68 is reached. This is another substantial factor in developing uniform density throughout the thickness of the boards, particularly in lower weight materials, in accordance with the present invention. Thus, the resin layer is autogenously foamed partially before heat of cure is applied, giving improved uniformity of density and high strength bonds to the cover films.

After a suitable period of time in the foaming zone 62, and at temperatures in the range of 150–300° F., the foaming is complete.

THE TRIM SECTION

From the foaming zone 62, the foamed layup 78 proceeds to an edge trim section 80. Here, parallel trim blades 82 are mounted above back up rolls 84. As the laminate 78 passes between the blades 82 and the back up rolls 84, edge trim 86 is provided.

The trim 86 is directed away from the production line to a waste disposal zone, not shown. The remaining laminate proceeds to a cut-off section 88. There, a vertically movable blade 90 is periodically activated and severs the moving laminate 78 into appropriate board lengths 92 for shipment and use. These lengths 92 or boards, are piled on a collecting platform 94 for packaging and storage.

It is to be noted that in accordance with this specific embodiment of the invention, using the specific resin formulation listed, ultimate strength of the foamed material was attained in about 12 hours at ambient temperature storage, with the boardsc undisturbed in bulk stacks.

DATA FOR BOARDS ACTUALLY PRODUCED

Typical polyurethane foamboards produced from the formulation of Example I, in actual runs on equipment schematically shown in FIGURE 1, and actually practicing the method of FIGURE 1 are as follows:

| Foamboard No. | Density, p.c.f. | Caliper, in. | Dry Edgewise Compression Strength | | Wet edgewise Compression Strength, lb./in. |
|---|---|---|---|---|---|
| | | | lb./in. | p.s.i. | |
| Urethane ID | 2.25 | .210 | 34 | 147 | 6.5 |
| Urethane 3K | 2.57 | .200 | 37 | 184 | 7.9 |
| Urethane 2C | 2.07 | .274 | 43 | 166 | 10.0 |

Edgewise compression determinations were made with 3 x 4" necked down specimens. They were tested on an Instron tensile tester after conditioning overnight at 70° F. at 50% RH and reported in lb./in. or p.s.i. Wet Strength was tested in the same manner after 20 minutes water soak.

Caliper variation, ±in. _____ .034  .006  .031

These data represent board strengths in the machine direction.

Processing data for the foamboards, were as follows:

| | Foamboard Number | | |
|---|---|---|---|
| | Urethane ID | Urethane 3K | Urethane 2C |
| Width, in | 54 | 44 | 38 |
| Belt speed, f.p.m | 75 | 125 | 75 |
| Forming nip, in | .010 | .002 | .003 |
| First Plates, ° F | 90 | 250 | 90 |
| Second Plates, ° F | 280 | 250 | 200 |
| Cure section, length ft | 34 | 34 | 34 |
| Dabco, percent | .47 | .40 | .47 |
| Foam time, sec | 35 | 40 | 32 |

This is the elapsed time between mixing and the time the foam reaches 4" height in an 8 x 8" box.

| | | | |
|---|---|---|---|
| Time in cure section, sec | 37 | 16 | 37 |
| Output, lb./min | 12 | 22 | 13 |
| Density, p.c.f | 2.25 | 2.57 | 2.07 |
| Caliper, in | .210 | .200 | .274 |

THE VERTICAL NIP

Figure 1A:
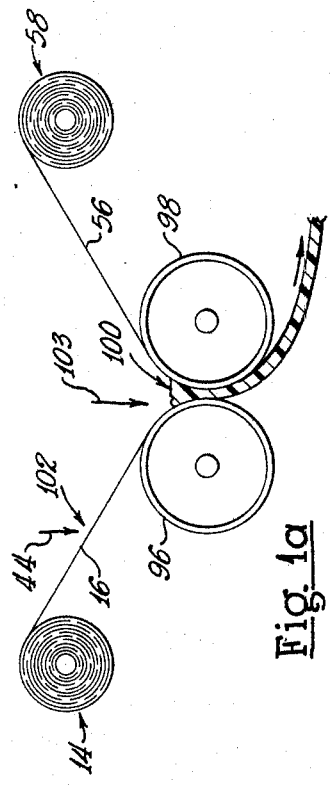
FIGURE 1a is a fragmentary side elevational view illustrating a vertical nip formation that can be used in the apparatus and process of FIGURE 1.

A logical extension of the invention is manifested in FIGURE 1a of the drawings. As there shown, the nip rolls 96 and 98 are disposed in side-by-side horizontal relationship. The nip 100 is therefore vertically disposed.

In this embodiment, the bulk roll 14 of bottom cover film 16 is suitably positioned above and to the left of the left hand nip roll 96. The bulk roll 58 of top cover film 56 is suitably disposed above and to the right of the right hand nip roll 98.

There are two positions where the resin can be applied in this embodiment, as follows:

(1) At the position 102, where application of the resin is made to the top side of the bottom cover film 16, well before it enters the vertical nip 100; and (2) At the position 103, where the application is made directly into the nip 100. This second aspect will be found helpful where the resin system is of a nature to unduly wet or penetrate the porous bottom cover film. Of course, when impervious cover films are used, there will be no problem. However, by applying the resin to the nip, the system can be adjusted to provide foaming so shortly after contact between the liquid resin system and the porous cover films, that there is no appreciable or discernible penetration of the porous cover films by the liquid resin system or bead, before the bead is spread to the full board width.

THE STEP PROCESS

The prior discussion has related to a continuous process where the cover films and the laminate made therefrom, including the resin system, are moved without stopping between the point of laminate formation and the ultimate board form.

In the extended scope of invention, the steps utilized can be effected at a plurality of fixed stations, spaced along a production line. In this embodiment of the invention, it will be understood that the increment layups are transported from one station to the next.

This aspect of the invention is shown in FIGURE 2.

A table 104 is positioned at station I. This is fitted with a flat top 106. Onto the top 106 is placed a cut sheet 108 of 42 pound kraft paper, as an exemplary cover film. A resin gun 44, suitably mounted upon an overhead carriage above the table 104, is then actuated and a bead of resin 111 run the length of the bottom cover film 108. Bead application is suitably in the arrow direction 110.

At station II, a top cover film 112 is then applied. This is merely laid on the resin bead 111 and bottom cover film 108.

At station III, the layup is run through the nip 114 between vertically stacked rolls 116 and 118. Passage through the nip 114 in the arrow direction indicated, spreads the resin bead 111 to board width. The rolled layup 120 is suitably held for a moment on the top 106 of table 104.

Thereafter, at station IV, the foaming and initial cure are effected. Of course, autogenous foaming is also practiced here before curing heat is applied. A lower, heated platen 122 supports the foaming laminate 78. The lower platen 122 is suitably steam heated by means of a coil 124. The upper platen 126 is of the nature of an "ironing" mechanism. Thus, it is merely brought down into light contacting relationship with the top of the sandwich to iron, or smooth out the top cover film during the foaming. Not enough pressure is applied to distort or compress the layup. The top cover film is merely smoothed out. Control by air cylinders 127 is utilized; and additionally a suitable stop is used to keep the platens 122 and 126 spaced apart an appropriate distance.

From station IV, the cured boards are moved away to a trim operation, and packaging for shipment, indicated by arrow 129.

The above represents a slight retrogression from the completely automated and continuously moving system shown in FIGURE 1. The system of FIGURE 2 is thus adapted for use by the smaller manufacturer where volume is not so high and wherein such manufacturer may be laying up more complex articles that are not adapted to the fast layup as would be required by the high speed, continuous system of FIGURE 1.

THE STATIONARY SYSTEM OF FIGURE 3

A still further retrogression of the invention is illustrated in FIGURE 3. This is particularly adapted for use by the still smaller, custom manufacturer, than is the system of FIGURE 2. This last embodiment illustrates a still further retrogression from a continuous production system, back through an incremental system, to a stationary system. Thus, the present embodiment illustrates the full range of versatility of the invention.

Here, all processing is effected at a single station. Thus a heatable platen 122 is used for all layup and processing operations or steps. The various steps involved are as follows:

(1) First, the bottom cover film 108 is laid down on the top of the platen 122;
(2) Then, a bead of resin 111 is laid down by means of a gun 44, moved in the arrow direction 110;
(3) The top cover film 112 is then applied;
(4) Thereafter, the resin bead 111 is ironed to board width, by passing a roller 128 across the layup in the arrow direction 130;
(5) Thereafter, liquid layer stabilization and autogenous foaming are effected;
(6) The upper, heatable platen 132 is then lowered into place in the arrow direction 134;
(7) One or both of the platens 122 and 132 can be heated for the curing operation. In some instances, a unique advantage of this aspect of the invention becomes evident from the use of two heated platens. Cover film bonding is usually of higher strength where the laminate contacts a heat source. Accordingly, for the small custom job shop, high quality laminates can be assured in a convenient and economical manner by this aspect of the invention.

Again, relative to the upper platen 132, this is only lowered into gentle contacting relationship with the foaming laminate to facilitate ironing or smoothing of the upper cover film; and is not meant to compact or increase the density of the foaming laminate.

After the foaming and cure are completed, the boards are removed to a trim and pack operation, not shown.

THE NOVEL LAMINATES OF THE INVENTION

Various physical factors of the laminates of invention have been listed above. These include the unique light weight and uniform density and uniform caliper or thickness, along with the high edgewise compression strength.

The following data relate to the various boards, A, B, and C discussed below and illustrate the importance of liquid layer or foam stabilization before applying heat of curing. Thus, a 30 to 60 second liquid layer stabilization and autogenous foam development of the resin layer is necessary for uniform foam structure and density. This has been brought out above in connection with the method description.

All laminates A, B, and C were made with the resin system described above in Example 1, using 42 pound kraft paper liners as cover films. Board A received a cure of 250° F., applied immediately after pouring the liquid resin and assembling the laminate.

Board B received the cure of 250° F., after a 30 second delay, following laminate assembly. Thus, foaming was well advanced before the cure temperature of 250° F. was applied.

Board C was delayed 60 seconds after laminate formation before the cure temperature of 250° F. was applied.

Board A exhibits highest densification at the liners. There is substantially no true foam structure. This if any, is at the very center of the board, and rind formation is extremely severe. Board B has a lesser amount of densification at the surfaces; this resulting from the 30 second delay before the cure temperature was applied.

The board C, the best produced, has substantially no densification or rind formation at the liners, or cover films.

A possible explanation of the phenomeon illustrated is that if heat is applied too quickly, a partial collapse of the foam layer may result. Thus, the foam layer has not stablized sufficiently to accept the curing heat without collapse.

FURTHER ASPECTS OF THE PRODUCTION

As regards the production of boards by the present invention, some interesting phenomena were observed in laboratory trials. Thus, the highest board strengths were achieved by a fast acting catalyst at a cure of 250° F. The heating was applied to one side only of the laminate.

Results from two sets of urethane foam boards cured at different temperatures demonstrate two principles of importance:

(1) Lower cure temperature of 250° F. yields higher column compression strength, than higher temperatures of 300–350° F.
(2) A fast catalyst at 250° F. yields higher edgewise compression strength than a slower catalyst at that temperature level.
(3) In all cases examined, the boards heated on one side yielded higher edgewise compression strengths than boards heated on both sides.

| Heated 1 Side Only | K-252 Fast Catalyst | | | K-252 Slow Catalyst | | |
| --- | --- | --- | --- | --- | --- | --- |
| | 250° F. | 300° F. | 350° F. | 250° F. | 300° F. | 350° F |
| Density | 2.58 | 2.56 | 2.48 | 2.16 | 2.03 | 2.19 |
| Caliper | 280 | 303 | 285 | 277 | 277 | 273 |
| Strength, p.s.i | 167 | 117 | 145 | 126 | 114 | 83 |
| Strength/density | 65 | 46 | 58 | 58 | 56 | 38 |

| Heated on Both Sides | K-236 Fast Catalyst | | K-236 Slow Catalyst | |
| --- | --- | --- | --- | --- |
| | 250° F. | 300° F. | 250° F. | 300° F. |
| Density | 1.85 | 2.00 | 1.97 | 2.3 |
| Caliper | 287 | 256 | 253 | 190 |
| Strength, p.s.i | 80 | 39 | 72 | 49 |
| Strength/density | 43 | 20 | 37 | 23 |

Foam time fast system: 28 seconds.
Foam time slow system: 40 seconds.

Both foam systems contained 0.01% tin catalyst. The fast system contained double the amount of amine catalyst (0.4% vs. 0.2% of pure catalyst (triethylene diamine) for K-252; and 0.6% vs. 0.32% triethanolamine for K-236).

It is an established fact that the higher amounts of catalyst will yield higher strengths. However, it seems novel that a lower temperature cure (250° F.) yields higher strengths than higher temperature cure (300° F.).

It would be expected that additional heat would aid the catalyzing effect.

EXTENDED SCOPE OF INVENTION

The prior discussion has related to rigid, semi-rigid, and flexible foam systems. These are all to be encompassed within the scope of the invention. Additionally, prepolymer foams, systems blown by reaction of isocyanate and $H_2O$ to produce the blowing gas, and others are applicable, in addition to the one-shot systems disclosed.

Although the low density aspect of less than two pounds per cubic foot has been relatively emphasized above, the extended scope of invention would encompass higher density materials, with of course the same improvements of uniformity of density throughout the thickness of the foam layer being inherent.

Although porous cover films have been disclosed above, the extended scope of invention is to be understood as being applicable to impervious cover films for applications requiring such. These would include silicone-treated casting papers, e.g., glassine, polyethylene, highly calendered papers, e.g., calendered kraft paper, regenerated cellulose, celluose nitrate, cellulose acetate, cellulose acetate butyrate, ethyl cellulose, vinyl choride-vinyl acetate copolymer, polyvinyl butyral, polystyrene, modified styrene polymers, rubber hydrochloride, polyamides (nylon), polyesters (polyethylene terephthalate), vinyl chloride vinylidene chloride copolymers, and the like. Metal foil or sheet metal, wood, rigid or flexible plastics and other impervious materials may also be used as will become apparent to the skilled artisan.

In the foregoing description, it has been mentioned that the cure is effected within a broad temperature range of about 150–300° F. However, it is to be pointed out, in view of the foregoing illustrations, that the cure, for purposes of developing optimum strengths, will be in the range of about 175–275° F.

ADVANTAGES OF THE INVENTION

A particular advantage of the invention resides in the fact that the boards are of improved strengths, through better uniformity of density throughout the thickness of the boards.

A further advantage is that with the particular resin system disclosed, extremely high speed production is provided by the method of invention. The cream time of the resin is relatively long, e.g., the time between mixing of the resin components in the applicator gun and the time when opacity of the liquid mix appears, to indicate that the foaming is just beginning. The foam time, following the cream indication is relatively short and rapid, therefore contributing to high speed production.

A further unique advantage of the invention is that porous cover films was utilized, with extremely high bonds strengths being produced. In the prior art, the Roop et al. Patent No. 2,956,310, dated Oct. 18, 1960, disclosed that impervious cover films were required, else the gaseous foaming agent would be lost. The result is duly unexpected in the present invention.

What is claimed is:

1. A process for preparing a laminated sheet-like structure comprising a layer of rind-free foamed polyurethane having a uniform density of about 2 pounds per cubic foot which comprises:

applying a preselected catalyst-containing foamable polyurethane material as a liquid layer onto a first porous fibrous sheet while said sheet and said liquid layer are maintained at about 70° F., said foamable polyurethane material being capable of remaining in a liquid foam, prior to foaming, by reason of said temperature control and said preselected catalyst-containing foamable polyurethane material, for at least about 60 seconds from the time that said foamable material is prepared, covering said liquid with a second porous fibrous sheet such that said liquid layer is sandwiched between the two fibrous sheets, applying sufficient pressure between the first and second fibrous sheet to uniformly spread out said liquid layer between said fibrous sheets to impart a uniform thickness thereto, maintaining said liquid layer in liquid form without adding heat thereto prior to foaming for a sufficient period of time to stabilize said liquid layer, autogenously foaming the polyurethane material until the substantially ultimate foamed thickness is achieved whereby improved uniformity of density and high strength bonds are achieved, the time during which said stabilization and said autogenous foaming occurs being from 30 to 60 seconds, subjecting the outer surface of only one of said fibrous sheets to a temperature within the range of 150 to 300° F. to cure said foamed polyurethane by the heat passing through from said outer surface of said fibrous sheet whereby to effect substantially higher edgewise compression strength than otherwise would be achieved if both of said fibrous sheets were heated, and applying only sufficient pressure to the outer surface of the other fibrous sheet while said foam is subjected to heat and is being cured, to smooth the fibrous sheet, said pressure being insufficient to compress said polyurethane layer.

2. A process in accordance with claim 1 wherein said pressure between said first and said second fibrous sheets to uniformly spread out said liquid layer between said fibrous sheets and to impart a uniform thickness thereto, is provided by a pair of nip rolls.

3. A process in accordance with claim 1 wherein said stabilization is carried out upon an unheated support of suitable length.

4. A process in accordance with claim 1 wherein said fibrous sheets are paper.

References Cited

UNITED STATES PATENTS

| | | | |
|---|---|---|---|
| 2,956,310 | 10/1960 | Roop et al. | 156—79 X |
| 2,957,207 | 10/1960 | Roop et al. | |
| 3,047,449 | 7/1962 | Coble | 156—79 |
| 3,123,508 | 3/1964 | Waugh | 156—78 |
| 3,158,529 | 11/1964 | Robitschek | 161—161 |
| 3,173,826 | 3/1965 | Campbell et al. | 156—79 X |
| 3,193,406 | 7/1965 | Mittelman | 156—79 X |
| 3,215,581 | 11/1965 | Carlson et al. | 156—79 X |

HAROLD ANSHER, Primary Examiner

C. B. COSBY, Assistant Examiner

U.S. Cl. X.R.

264—47, 55